US007356615B2

(12) United States Patent
Cai et al.

(10) Patent No.: US 7,356,615 B2
(45) Date of Patent: Apr. 8, 2008

(54) PLUGGABLE SERVICE DELIVERY PLATFORM

(75) Inventors: Hong Cai, Beijing (CN); Dong Liu, Beijing (CN); Leo Y. Liu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 09/750,940

(22) Filed: Dec. 29, 2000

(65) Prior Publication Data
US 2001/0016880 A1 Aug. 23, 2001

(30) Foreign Application Priority Data
Dec. 30, 1999 (CN) ............................. 99 1 27442

(51) Int. Cl.
G06F 15/16 (2006.01)
G06F 15/173 (2006.01)
(52) U.S. Cl. ...................... 709/246; 709/223
(58) Field of Classification Search ................ 709/220, 709/222, 223, 227, 228, 246
See application file for complete search history.

(56) References Cited
U.S. PATENT DOCUMENTS 6,466,971 B1 * 10/2002 Humpleman et al. ........ 709/220
6,546,419 B1 * 4/2003 Humpleman et al. ........ 709/223
6,581,094 B1 * 6/2003 Gao .............................. 709/220
6,585,778 B1 * 7/2003 Hind et al. ................... 715/513
6,618,764 B1 * 9/2003 Shteyn ......................... 709/249
6,725,281 B1 * 4/2004 Zintel et al. ................. 719/318
6,738,951 B1 * 5/2004 Weiss et al. ................. 715/523
6,763,460 B1 * 7/2004 Hild et al. .................... 713/161
6,788,768 B1 * 9/2004 Saylor et al. ............. 379/88.13
6,798,867 B1 * 9/2004 Zirngibl et al. ........... 379/88.17
6,826,597 B1 * 11/2004 Lonnroth et al. ............ 709/207
7,043,532 B1 * 5/2006 Humpleman et al. ........ 709/208
7,065,562 B2 * 6/2006 Courtney ...................... 709/220
7,162,534 B2 * 1/2007 Schleiss et al. .............. 709/232
2002/0087655 A1 * 7/2002 Bridgman et al. ........... 709/217

OTHER PUBLICATIONS

"Merriam-Webster's Collegiate Dictionary", 2001, Merriam-Webster, Incorporated, Tenth Edition, pp. 94 and 704.*

* cited by examiner

Primary Examiner—Andrew Caldwell
Assistant Examiner—Douglas Blair
(74) Attorney, Agent, or Firm—F. Chau & Associates, LLC

(57) ABSTRACT

The present invention discloses a pluggable service delivery platform for supporting many devices to many services in an e-business application, comprising a device-platform interface, a service-platform interface and a platform kernel section. The service delivery platform of this invention is a flexible and scalable platform to easily "plug" a new device and a new service, and the different parts of the platform are componentized. Any one of the components can be replaced by a 3$^{rd}$ party's products, providing they abide certain open interface like Java Servlet, LDAP, etc.

9 Claims, 8 Drawing Sheets

Device-Platform Interface

PLUGGABLE SERVICE DELIVERY PLATFORM

BACKGROUND

1. Technical Field

This invention relates to a service delivery platform that supports many devices to access many services and more particularly, to a pluggable service delivery platform in which many devices and many services are pluggable.

2. Description of Related Art

Nowadays there are numerous pervasive computing devices such as handheld PCs, smartphone, mobile phone screenphone, pager, fax machine, etc. They all have computing power and people wish to use these existing devices to access the network and do e-business. But there also exists challenges, since current network infrastructure is designed for the personal computer ("PC"). At the same time different services have different features. Thus, some effort is needed to connect a new device to the network, if the backend system is changed, e.g., if some new service is added, the application on the device must be changed (or added); similar effort is needed to change the logic of backend services when new devices roll out. With the rapid development of network computing, there is a need for a pluggable service delivery platform that can support many devices and many services in a flexible and scalable way.

Some companies have designed some platforms for supporting many devices to access many services, but these platforms are designed specifically for some devices and services and there is no flexible way to plug a new kind of device or a new type of service into the platform.

SUMMARY OF THE INVENTION

The pluggable platform of the present invention can be used to overcome the shortcomings of existing platforms. The platform can be used in e-business and support many kinds of devices to access many types of services, while at the same time, new devices or new services can be easily added to the platform. This is where "pluggable" comes from.

The pluggable service delivery platform of the present invention comprises:

Device Abstraction Layer (DAL)

It accepts the requests from devices and transforms them into XML and then sends them to the kernel of the platform. It also transforms the response XML documents from the platform into a device specific format for presentation. It further comprises:

(1) Common transcoding component, shared by all devices and used for transforming between different kinds of data formats.

(2) Device dependent component, transforming between (whatever kind of data format/transporting protocol for that particular device) and (XML over HTTP).

Service Abstraction Layer (SAL)

It abstracts the common requirements from different services as a service profile. For each kind of service in some domain, a wrapper (adapter) is provided. The wrapper is used for transforming between (legacy data format/network protocol) and (XML/HTTP).

Kernel Service Engine

The functions provided by the platform kernel service engine include:

manage profiles of users, devices and services (i.e., user/device/service)
synchronize/asynchronize service engine
interface with other platform components
transfer information between components within the platform using XML.

The platform is "pluggable" in three aspects.

Firstly, it is pluggable in the sense that a new kind of device can be easily plugged into the platform so long as the device profile that describes the device capability is provided.

Secondly, it is pluggable in the sense that a new type of service can be easily plugged into the platform so long as the service profile that describes the service feature is provided.

Thirdly, it is pluggable in the sense that the components that constitute the platform are pluggable, so any one of the components can be replaced by third party products, so long as the latter comply with a predefined interface, such as a Java Servlet and LDAP.

The differences between the platform of this invention and an exemplary existing platform is listed in Table 1. A local network company had the similar idea of a many-to-many platform called LISP/6A.

TABLE 1

| Features | LISP/6A | This platform |
| --- | --- | --- |
| Transcoding | No. Format has to be customized for each kind of device | Yes. The same content can be adapted to different kind of PvC devices |
| Scalability | No | Yes. With Network Dispatcher & Web Traffic Express & Distributed Application Tester |
| Contents representation in platform | Fixed segments with annotation | Represented in XML, easy to be extended |
| Support synchronized and asynchronized communication | No | Yes |
| Flexibility for plug in new device | No | Yes |
| Flexibility for plug in new service | No | Yes |
| Componentized parts within platform | No | Yes |

DETAILED DESCRIPTION OF PREFERRED EMBODIMENTS

Figure 1:
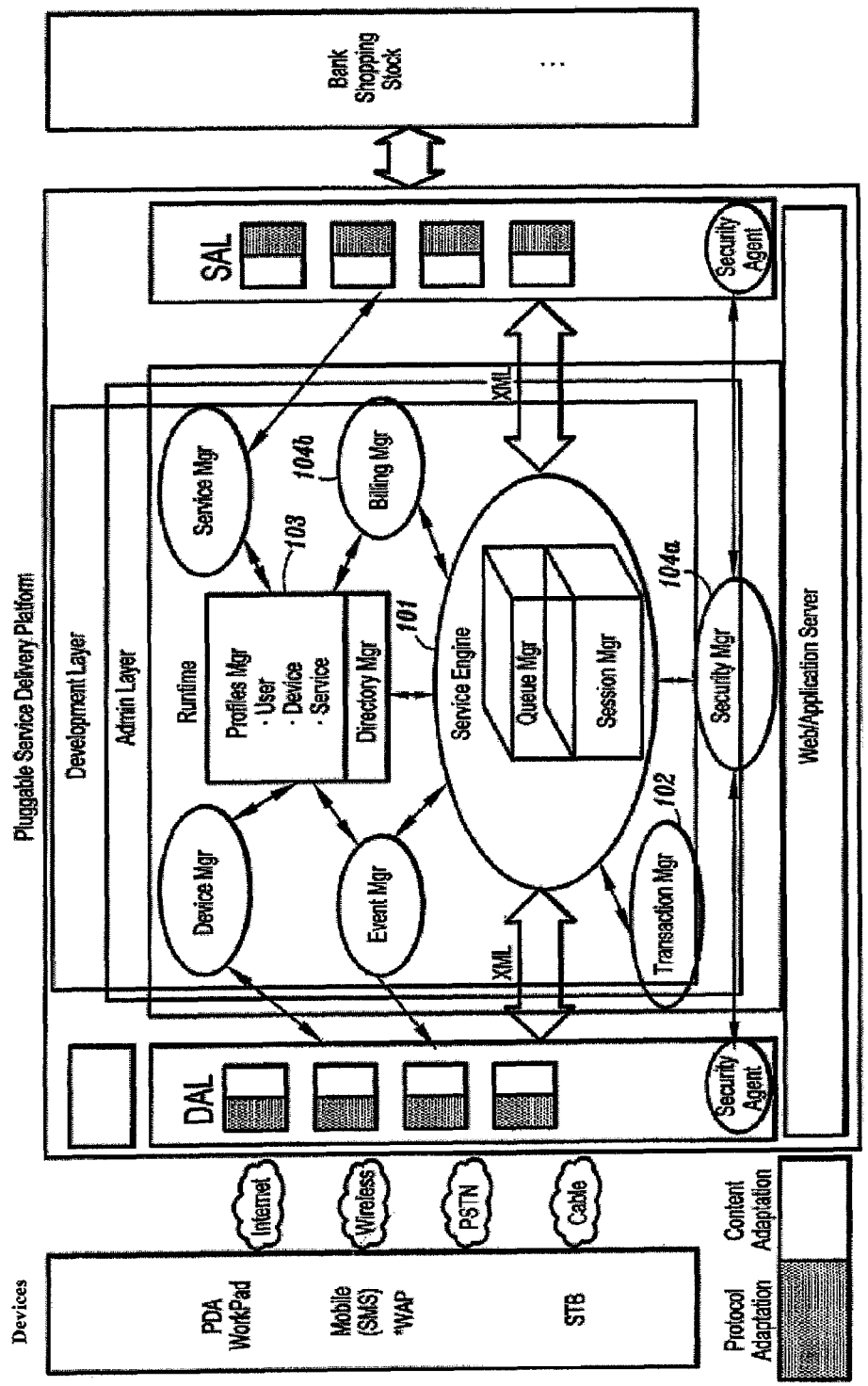
FIG. 1 shows a preferred embodiment of a pluggable service delivery platform, which focuses on components of a platform kernel.

It is to be understood that the exemplary system modules and method steps described herein may be implemented in various forms of hardware, software, firmware, special purpose processors, or a combination thereof. Preferably, the present invention is implemented in software as an application program tangibly embodied on one or more program storage devices. The application program may be executed by any machine, device or platform comprising suitable architecture. It is to be further understood that, because some of the constituent system modules and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Before describing preferred embodiments in detail, the terms used in the present invention are first listed as follows:

Terms Used:

1. XML (eXtensible Markup Language): XML is a kind of markup language endorsed by W3C (Web standard organization). It is used to describe/define structured data and separate the data with presentation (compared with HTML which strongly combines data and the presentation). The same set of data expressed by XML language can generate a different presentation (e.g., Markup Language) with a different style sheet language (e.g., XSL: eXtensible Stylesheet Language). Highly-structured data represented in XML are very suitable for automatically exchanging information between applications. The adoption of XML for exchange between different components is a primary characteristic of the present invention.

2. WAP (Wireless Application Protocol): WAP is a wireless communication protocol specifically designed for handheld devices (especially mobile phones). WAP is critical for mobile phones to access the information on the Internet just as HTML/HTTP is critical for a to access the Internet.

3. Servlet: Servlet is a Java small service application, i.e., a special kind of Java class running on a Web server. It can accept the request from the Web (e.g., via a browser), parse the parameters and execute the predefined logic (such as a data connection with the backend system) and generate a response and send the response back to the browser. Since Java Servlets are written in Java they are cross platform (OS) and highly portable applications. Java servlet can dynamically generate different pages for different kinds of devices such as HTML for PC, WML for WAP phone, etc.

4. Transcoding: Transcoding is a kind of transformation technique that transforms the same set of data into different pages based on predefined criteria (such as display resolution, color depth, multimedia support). The technique further includes many components, such as an image transcoder (e.g., GIF->JPEG, JPEG->BMP, color->grey->black/white) and a text transcoder (e.g., text abstraction, text->audio). Using a transcoding technique, one type of XML document can be transformed into another type of XML document and can further be transformed into some kind of presentation (e.g. HTML or WML) by style sheet language.

5. Device gateway: The device gateway in the present Invention sits in the device abstraction layer. It can accept a request from a device over some sort of network protocol transform the request into XML over HTTP, then the send the request to the platform kernel. After getting the data from the backend system through the platform kernel, it then transform the page into device readable page and send to the other device over the network that the device connects to. The device-platform interface may provide a corresponding gateway for each kind of device, for transforming the information representation XML into a file format which is adapted for various devices for displaying and transforming among communication protocols based on the script language of various devices stored in the device profile.

6. Service adapter (wrapper): The service adapter in the present invention sits in the service abstraction layer. It transforms between the platform format (XML)/protocol (HTTP) and service specific format/protocol.

The following paragraphs will illustrate in detail how to implement the invention.

The pluggable service delivery platform shown in FIG. 1 comprises three parts, Device Abstraction Layer (DAL), Service Abstraction Layer (SAL) and Kernel Service Engine. FIG. 1 focuses on components of a platform kernel. The details of SAL and DAL will be illustrated in FIG. 4 and FIG. 5 respectively. As shown in FIG. 1, the platform kernel comprises a service engine 101, a runtime monitor 102, a profile manager 103 and auxiliary components 104 (such as a security manager) 104a, a billing manager 104b, etc). As shown in FIG. 1, XML is used within the platform as an interface language. XML is used widely in the platform to exchange information between different components in the platform. XML is also used in the DAL and SAL, such that information processed in the platform will be based on XML. For the service engine, both a synchronized service engine and an asynchronized service engine are provided. The service engine supports synchronized communications by session as well as synchronized communications by queue. For example, the synchronized service engine can be based on IBM WebSphere which is a Web application server and has strong XML support.

Figure 2:
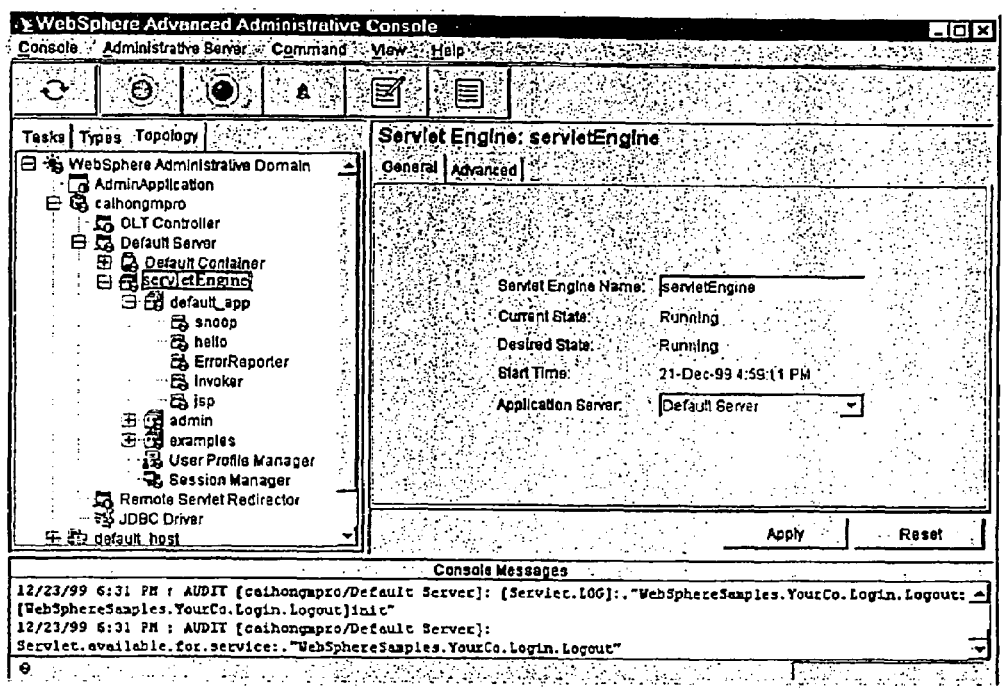
FIG. 2 shows the servlet (service engine) running on WebSphere (an IBM Web application server).

FIG. 2 shows how servlets are organized in WebSphere. As shown, servlets are built on and managed by WebSphere (start, stop, add, delete). A chain of servlets can be called when a request from the device is sent to the platform. The platform may process the request and respond with a page. The first servlet called, which is also the most important one, corresponds to a called URL. The servlet can then call other servlets which form a servlet chain. As shown in FIG. 2, under the WebSphere application server (Default Server), there is a ServletEngine which is the base Servlet engine. Under ServletEngine there are many directories, such as "default_app", "admin", "examples", etc. Under some specific application, there are some servlets that will be used. For example, under "default_app", there are "Snoop" servlet, "hello" servlet, "ErrorReporter" servlet, etc.

Figure 3:
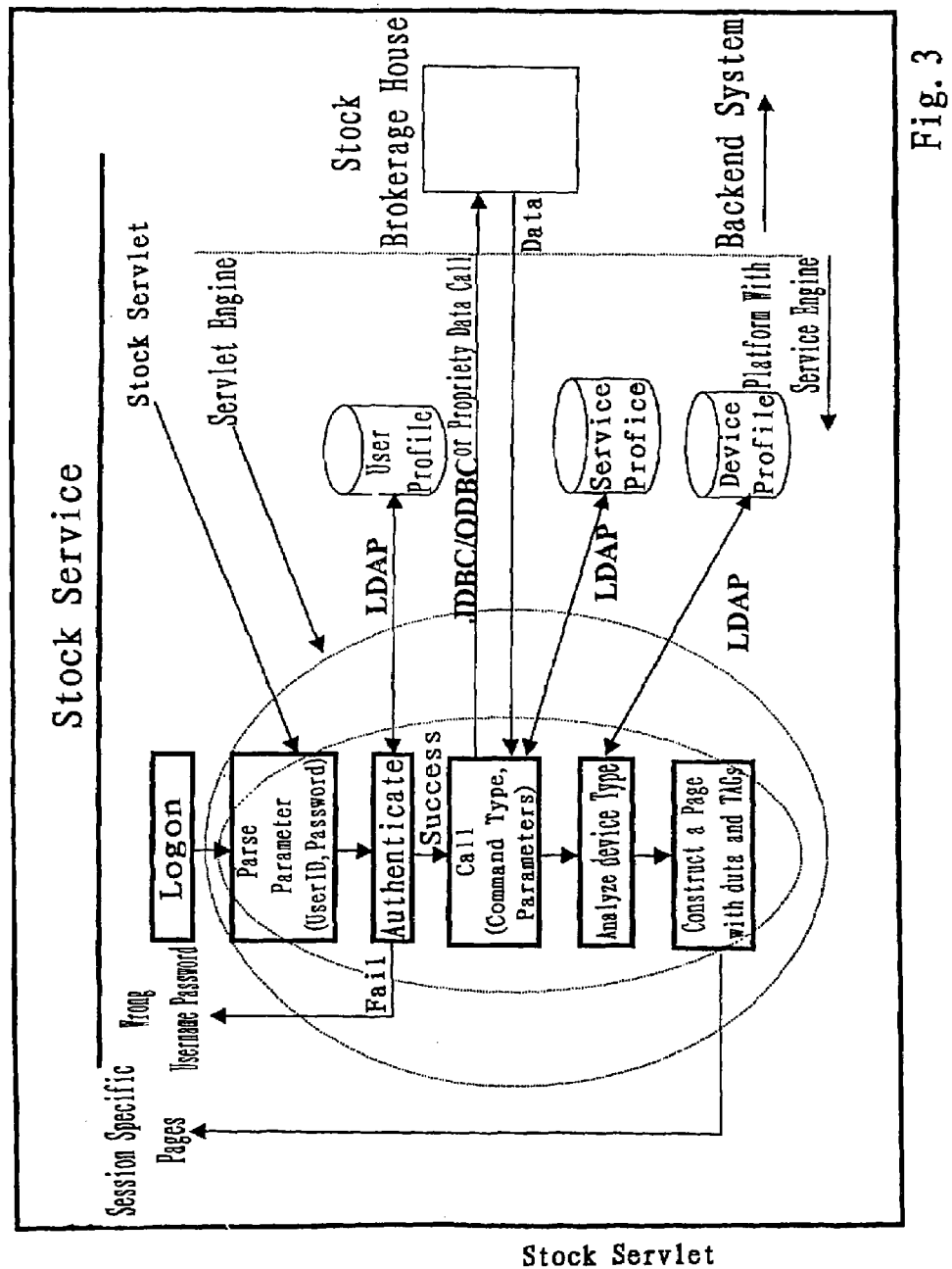
FIG. 3 shows the data flow between the service engine and the backend service (such as stock service).

FIG. 3 shows the data chart and also the interaction between the service engine and the backend service (e.g. stock service).

The platform runtime monitor 102 is used to monitor the runtime status of platform.

The profile manager 103 is used to manage a user profile, device profile and service profile.

The user profile can include items such as, user ID, user name, telephone number, etc.

The device profile can include items such as, device ID, vendor name, device type, display resolution, multimedia capability, and corresponding XSL (which is used to present XML data on that specific device).

The service profile can include items such as, service ID, service provider, operating time, start URL, etc.

Besides the above components, the platform kernel can also include many auxiliary components, such as a device manager to manage device access, a service manager to manage service connection to the platform, an event manager to trigger some platform related event and send to user, a transaction manager, a billing manager, and a security manager. All the above components are pluggable and can be replaced by third party products.

In FIGS. 1-3, the kernel parts of the platform are described in detail. These components are used to manage user/device/service profile information, provide a synchronized/asynchronized service engine, use XML to exchange information, and carry transaction related information between different parts of the platform. As shown in FIG. 1, the platform kernel includes three layers: a runtime layer, an admin layer and a development layer. Platform APIs are used to interact between layers. The runtime layer provides online information access and control, the management layer provides service such as add/delete user/device/service information, and the development layer provides support for a new device/service.

Figure 4:
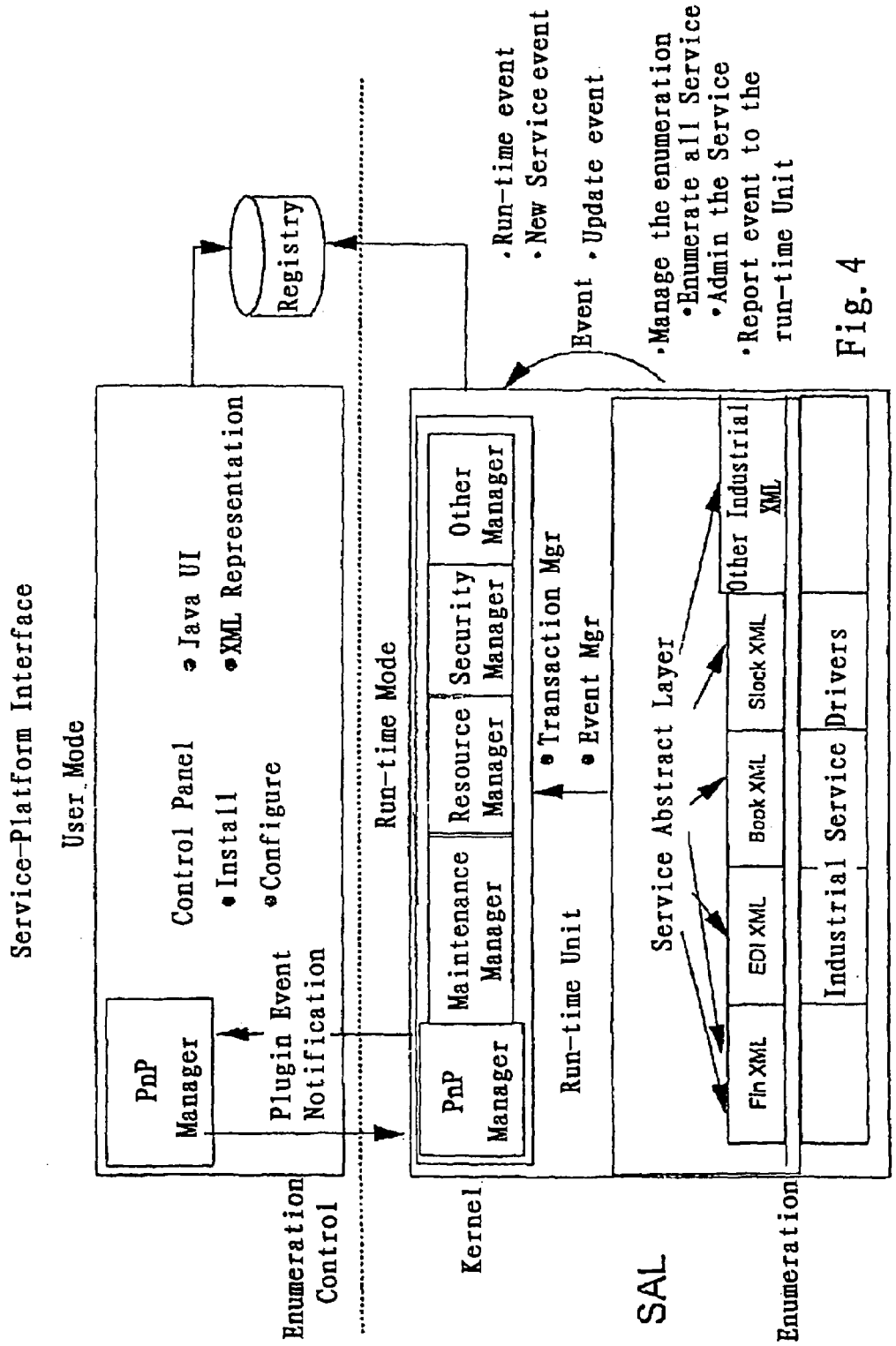
FIG. 4 illustrates the service abstraction layer (SAL) of the pluggable service delivery platform of FIG. 1.

In FIG. 4 SAL will be described in detail.

There are mainly two portions in FIG. 4. The first portion, on top of the dotted line, is what we call the Control mode. The administrator can use the user interface ("UI") under this mode to install new services and configure the existing services. Both the control mode portion and run-time mode portion have a PnP (plug and play) manager. The enumeration layer, as shown in FIG. 4, is used to abstract the common features of different services and differentiate them by different company. The second portion, under the dotted line, is what we call the Run-time mode and has mainly three layers. The bottom layer is the enumeration. Specific companies may have its specific drivers which should obey the open service protocol. The middle layer is the Service Abstract Layer (SAL). SAL abstracts the common requirement of different services. The upper layer is the kernel of the run-rime mode and is called the run-time unit. It further comprises several important parts. The first one and the most important one is the PnP manager that corresponds to the PnP manager in the Control mode portion. It has an event listener to listen to events coming from the service-platform interface. It manages the plugged services to the platform. Then there is the maintenance manager. The maintenance manager is used to manage the lifetime of a service like when it is opened and closed, when it will expire, etc. The third one is the resource manager. Then there is the security manager to manage the security in the platform to securely transfer messaged and documents. The total service design architecture is EVENT DRIVEN and STATE BASED. The relationship between different layers is like this. The Service Abstract Layer maintain and administrate services and report events to the run-time unit. It also works with the run-time unit to manage transactions to make sure that several commands from one transaction will not be broken into pieces. The main event types include a New service event, an Update event, etc. All the events are related to service-platform interaction and platform operation.

Figure 5:
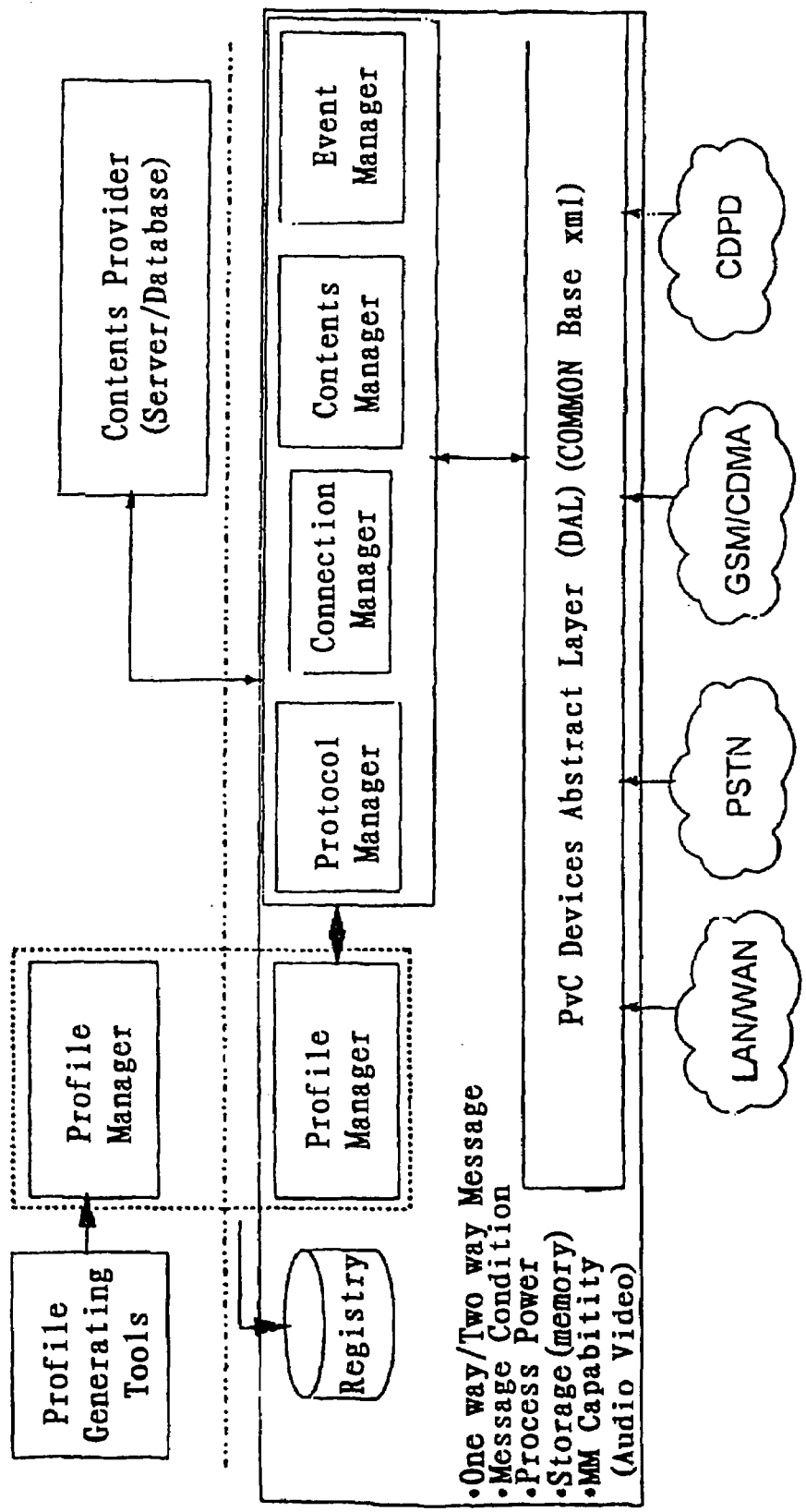
FIG. 5 illustrates the device abstraction layer (DAL, i.e., device-platform-interface) of the pluggable service delivery platform of FIG. 1.

In FIG. 5 DAL will be described in detail.

There are also two parts in FIG. 5. The one above the dashed line includes Profile Generating Tools to generate a profile for some new device. The information will be saved in the registry and can be accessed by the profile manager of the administrator UI. The other part under the dashed line includes a Device Abstract Layer, a Profile Manager, and Run-time managers. The run-time managers then include a Protocol manager, a Connection manager, a Contents manager and an event manager. A common interface (Device Abstract Layer) is needed to define the common behavior of PvC devices. The devices may connect to the platform in different ways (e.g. LAN/WAN, PSTN, GSM/CDMA and CDPD), so gateways are needed for each kind of connection. No matter how the device is connected to the platform, the devices' rich features can be extended from this common base. And this common base is expressed in XML too. The profile managers serve as the focal point between the platform device administrator and the platform run-time kernel. The features of the device are saved in the registry as (key, value) pairs. Protocol manager is used to decide whether to send the message through IP or HTTP protocol in the platform. The connection manager is used to manage the connection in a transaction, e.g., set up the connection in response to a device request, send a message when certain conditions meet, etc. The contents manager is built upon the transcoding technique. It decides how to send out the message. It assembles the contents based on the devices' profile. The event manager generates system events when a device contacts the platform. (A certain profile header should be provided in the head of the message that the device sends). No matter how the device accesses the platform (through GSM, CDPD, PSTN, LAN or other ways), a description of the device (profile) must be included in the header of the message the device sends to the platform when the device is logged on.

In the above paragraphs, a preferred embodiment of a pluggable platform according to the present invention is illustrated. The platform has the following advantages: no matter what kind of device the end users use they can always access the key information in a consistent and natural way and all the returned pages will fit well on that device. This also simplifies the service connection process. For now, the service providers need only one reserved line to connect the service to the service delivery platform.

Figure 6:
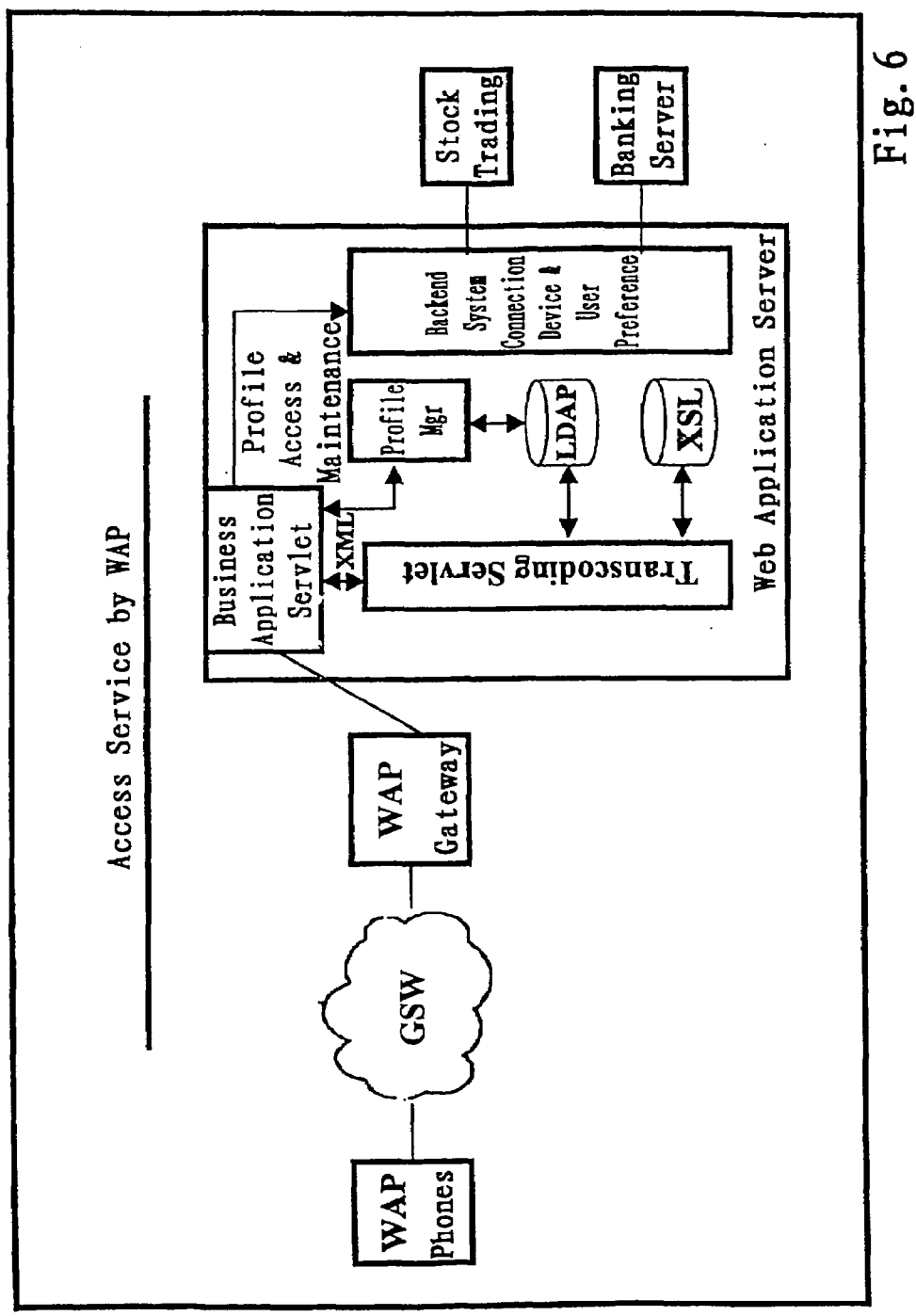
FIG. 6 shows an implementation of the present invention using a WAP phone to access services through the platform.

FIG. 6 shows how a service can be hosted on the platform. To be specific, the process of using a WAP phone to access the services through the platform is shown. Firstly, various WAP phones connect to the WAP gateway through a GSM network and then data channels (PSTN connection or ISDN connection). The information before WAP gateway is binary WML over WAP, while after the WAP gateway, will be WML over HTTP. When a user uses the WAP phone, some URL has actually been selected, and the request will be sent to a servlet that corresponds to the URL. The servlet will analyze the request parameter, call some service wrapper as required, then get data from background services. This kind of data connection is common to domain service and independent of the specific service provider. After getting the data, the servlet will reorganize the data and generate a page (e.g. HTML or WML). The page can be generated by transcoding means after retrieving the device style sheet (XSL) stored in device profile through LDAP call.

Figure 7:
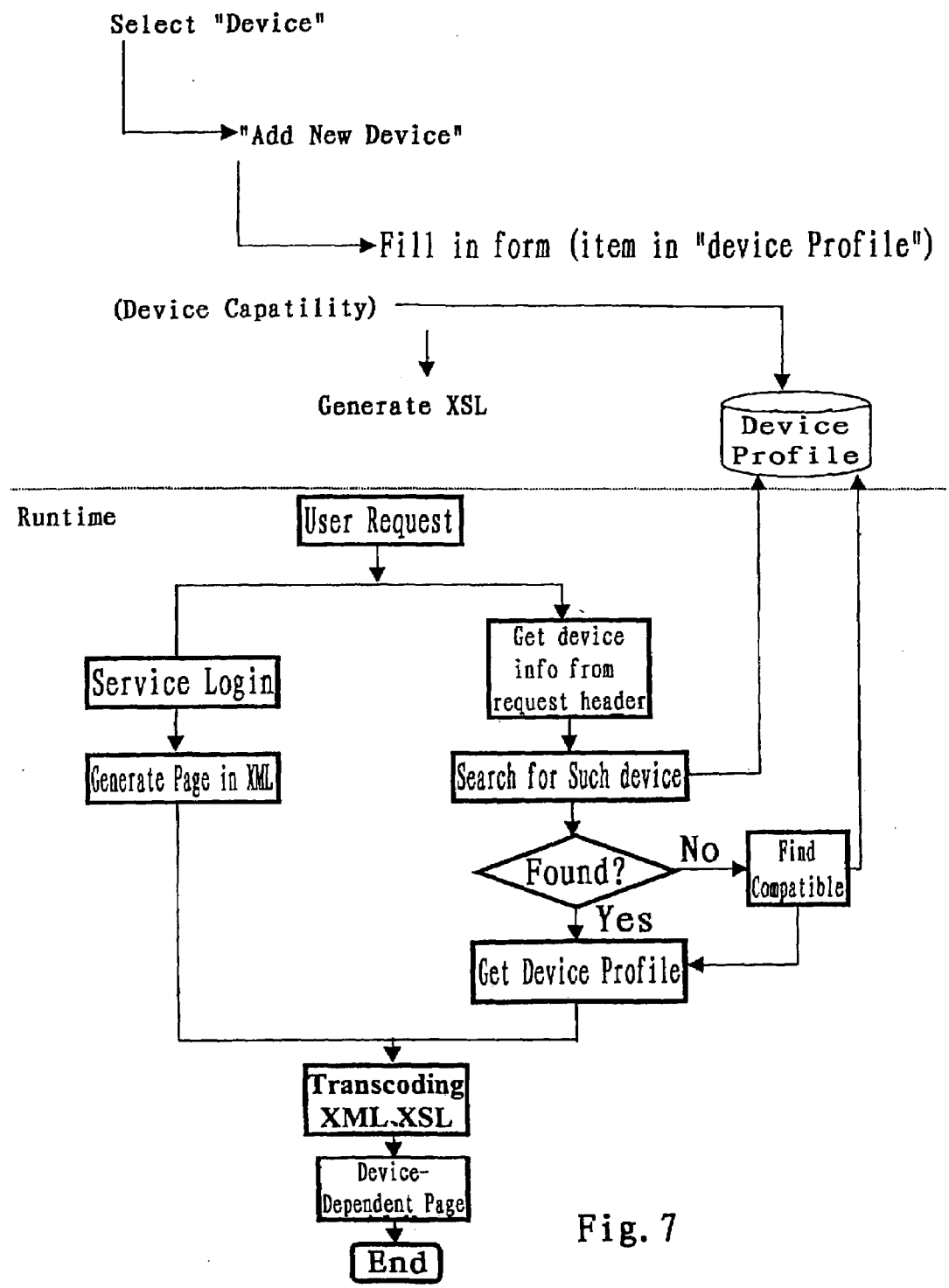
FIG. 7 shows the process of adding a new kind of device to the platform.

FIG. 7 shows how to plug a new kind of device. When adding a new kind of device, the system administrator can use the admin tools and select "Add New Device" item, and then fill in a form to generate a device profile in the profile manager. Among the description, XSL is used to describe device capability. At the runtime, when the platform receives user requests, on one hand, it will generate XML data based on the return from service, and on the other hand, it will retrieve the device profile from the profile manager, then generate the final page layout based on the transcoding technique.

Figure 8:
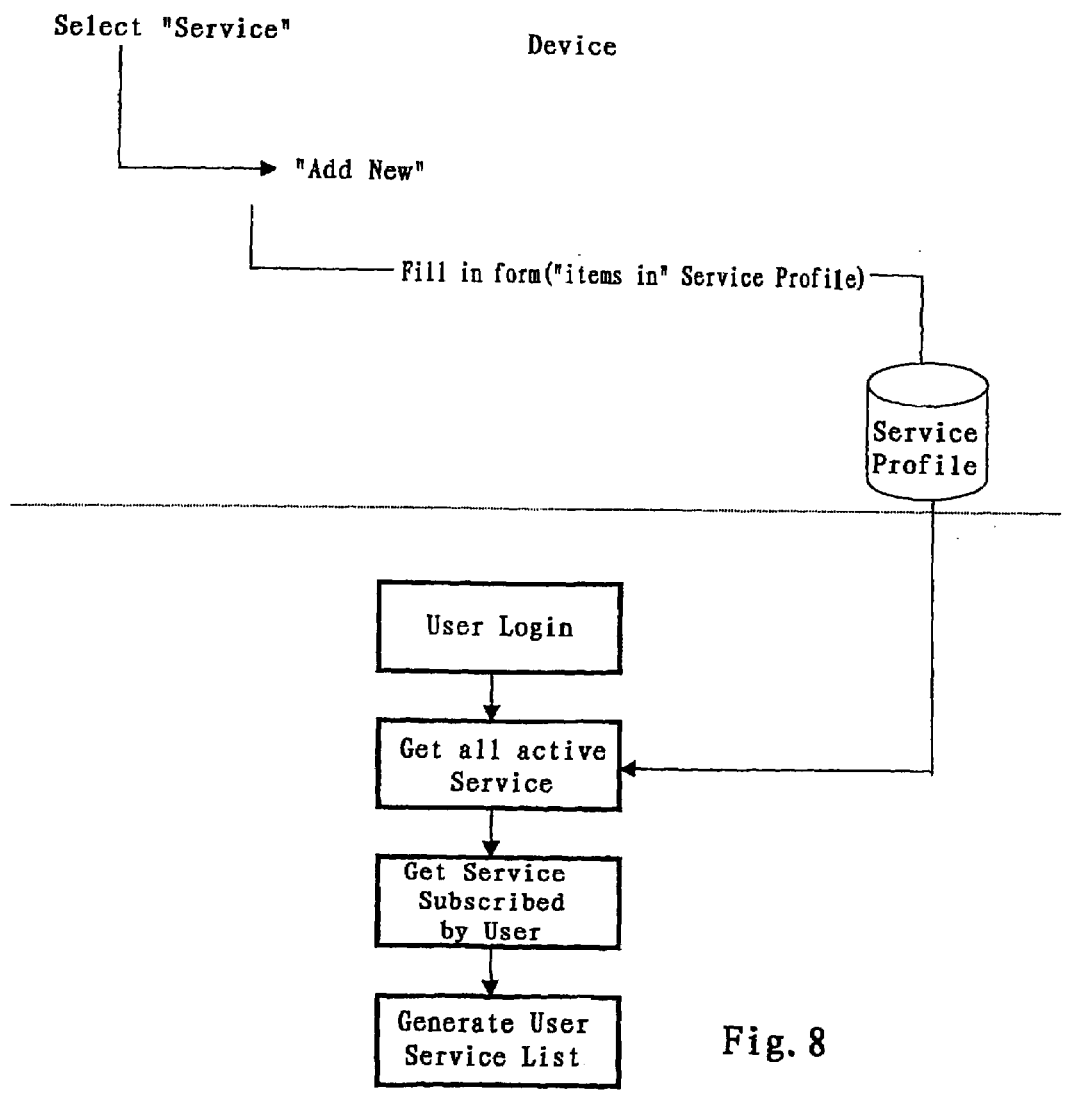
FIG. 8 shows the process of adding a new type of service to the platform.

FIG. 8 shows how to plug a new kind of service. When adding a new kind of service the system administrator can use the admin tools and select "Add New Service" item, then fill in a form to generate a service profile in the profile manager. At the runtime, when the user connects to the platform, only a dynamic service list that the user subscribes will be listed.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A computer server system, comprising
a pluggable service delivery system that supports access to different types of backend services by different types of computing devices, the pluggable service delivery system comprising:
a memory system to store programming instructions that are executable to implement a device abstraction layer, a kernel service engine, a service abstraction layer, and a processing system,
the kernel service engine comprising:
a runtime layer to provide online information access;
an administrative layer to add and delete user, device, and service information; and
a development layer to provide support for addition of new services and devices supported by the platform,
wherein the processing system executes the stored programming instructions to:
(i) implement the device abstraction layer to (1) receive service requests from different types of computing devices, (2) transform the received service requests into XML requests that are sent to and processed by the kernel service engine and (3) transform XML documents, which are received from the kernel service engine in response to the XML requests, into device specific formats supported by the computing devices;
(ii) implement the kernel service engine to control access to different types of services through the service abstraction layer and to provide an XML interface between the device abstraction layer and the service abstraction layer; and to
(iii) implement the service abstraction layer to (i) enable seamless access to the different types of services through invocation of backend data sources through service wrappers, wherein each service wrapper provides a standard interface to a corresponding one of the different types of services and (ii) transform data accessed from backend data sources into XML, formatted documents.

2. The computer server system of claim 1, wherein the kernel service engine is a synchronized service engine and an asynchronized service engine.

3. The computer server system of claim 1, wherein the device abstraction layer transforms an XML document to one of a plurality of different kinds of data formats supported by the computing device based on a device style sheet.

4. The computer server system according to claim 1, wherein the device abstraction layer provides a corresponding gateway for each of the computing devices for transforming between different communication protocols.

5. The computer server system according to claim 1, wherein the kernel service engine includes a profile manager to manage user, device, and service information.

6. The computer server system according to claim 1, wherein the kernel service engine transfers user, device, and service information between the services and devices.

7. The computer server system according to claim 1, wherein the administrative layer adds a new device by generated a device profile.

8. The computer server system according to claim 1, wherein the administrative layer adds a new service by generating a service profile.

9. The computer server system according to claim 1, wherein the kernel service engine comprises a billing interface and a platform runtime monitor.

* * * * *